July 28, 1942. W. O. SCHULTZ Re. 22,149
FUSE LINK THROWOUT DEVICE
Original Filed March 10, 1937
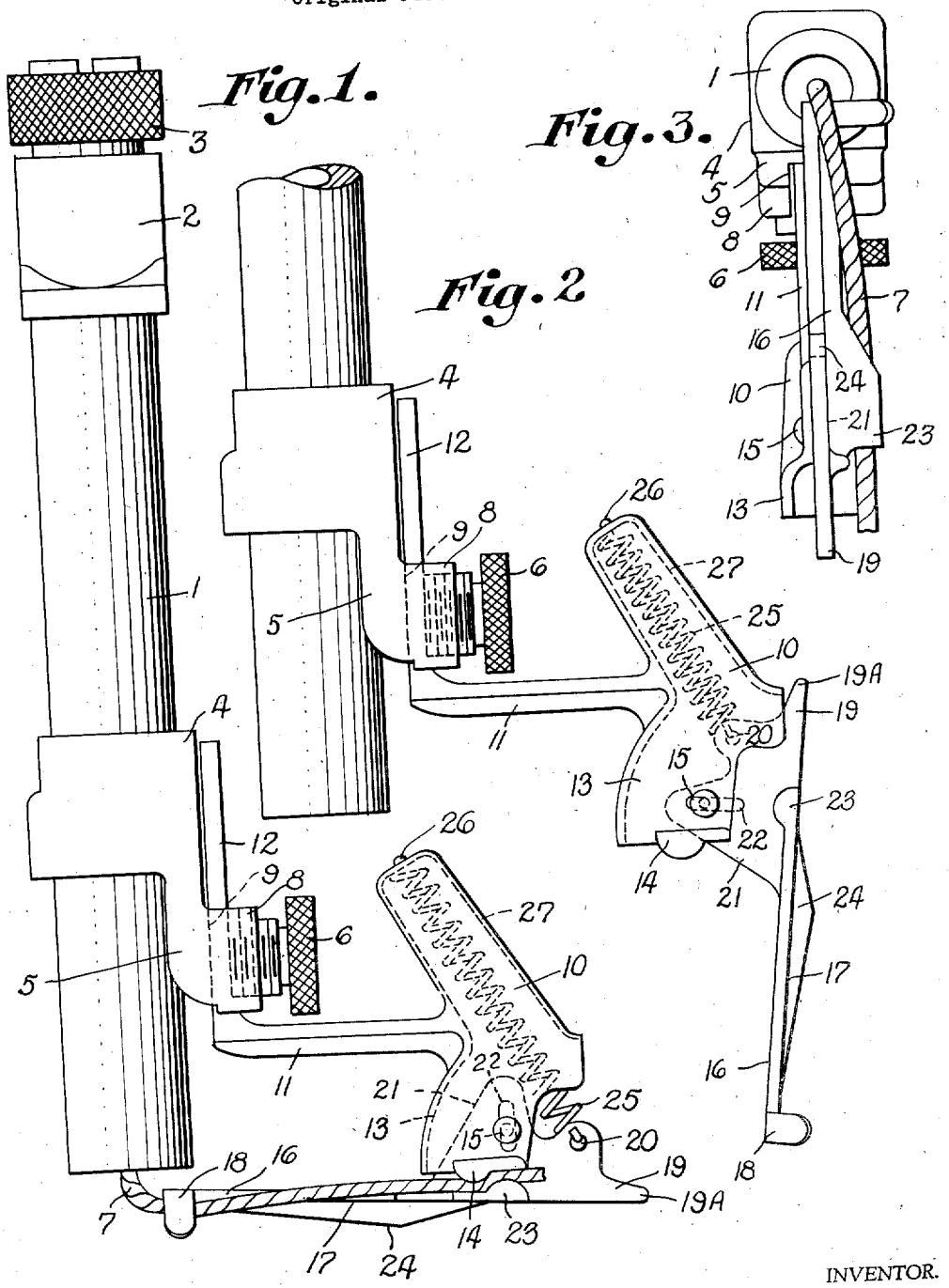
INVENTOR.
William O. Schultz
BY Chester W. Brown Att'y Reissued July 28, 1942

Re. 22,149

UNITED STATES PATENT OFFICE 22,149

FUSE LINK THROWOUT DEVICE

William O. Schultz, South Milwaukee, Wis., assignor to Line Material Company, South Milwaukee, Wis., a corporation of Delaware Original No. 2,126,217, dated August 9, 1938, Serial No. 130,055, March 10, 1937. Application for reissue October 12, 1939, Serial No. 299,188

7 Claims. (Cl. 200—127)

This invention relates to improvements in fuse link throwout devices for expulsion fuses.

It is an object to provide for throwout devices comprising a pivoted throwout lever and a spring biasing the lever, a protecting hood for the spring and the pivot bearing for the lever, whereby the device will operate freely under all conditions to which it may be subjected.

More specifically, it is an object of this invention to provide for throwout devices having a fixed pivot pin and a spring-biased lever pivotally mounted on the pin and slidable laterally thereon, a protecting hood for the spring and a protecting apron or skirt substantially enclosing the slidable portion of the lever.

The device illustrated in the drawing and described hereafter is substantially identical to that illustrated in Figs. 1 to 3, inclusive, of the copending application of William O. Schultz and Chester W. Brown, Serial Number 130,054, filed March 10, 1937, for Fuse link expelling means.

In the drawing:

Fig. 1 is a side elevation illustrating a preferred form of this invention.

Fig. 2 is a fragmentary view in side elevation of the device shown in Fig. 1 after it has operated.

Fig. 3 is a lower end view of the device shown in Fig. 1.

Like parts are identified by the same reference characters throughout the several views.

In all of the expulsion fuses shown in the drawing, the fuse comprises a cartridge 1 having an upper contact ferrule 2, closure cap 3, lower contact ferrule 4 spaced from the lower open end of the tube and provided with a depending clamping arm 5, and a clamping screw or bolt 6 and a fuse link 7 disposed in the tube for electrically connecting the upper contact ferrule 2 and the lower contact ferrule 4. The clamping arm 5 is provided with a clamping lug 8 which is slotted at 9 in a vertical direction and longitudinally relative to the cartridge 1. The clamping lug 8 is also provided with a threaded recess extending toward the base of the slot 9 and adapted to receive the threaded end of the clamping bolt 6.

In the preferred form of the throwout device illustrated in Figs. 1 to 3, inclusive, a hollow sleet hood 10 is provided with a supporting arm 11 having a vertically extending portion 12 positioned in the slot 9 and removably secured therein by means of the clamping bolt 6. The sleet hood 10 is also provided with a recessed apron or skirt 13 comprising side webs connected by a septum immediately adjacent the hollow or recess 27 in the hood 10, the skirt, webs, and septum extending below the arm 11 and with a clamping jaw 14 extending in a horizontal direction laterally from the lower margin of the skirt. As shown, this jaw 14 is provided with an arcuate clamping face upon its under side. The skirt 13 is provided with a pivot pin 15 extending to the interior of the skirt for supporting the lever as will hereinafter appear.

The throwout lever 16 comprises a link-tensioning arm 17 provided with a link-engaging finger 18, a spring-engaging arm 19 provided with a spring-receiving aperture 20 in the arcuate peripheral portion of the arm 19, a pivot-engaging arm 21 extending to the interior of the apron 13 and provided with an elongated slot 22 slidably receiving the pin 15, and a clamping jaw 23 cooperating with the clamping jaw 14 for securing the fuse link 7 therein as will hereafter appear. As shown, the clamping jaw 23 is provided with an arcuate clamping surface offset from the arcuate clamping surface on the clamping jaw 14. The link-engaging arm is provided with a reinforcing rib 24 on the lower side thereof.

The throwout lever 16 is biased to the position shown in Fig. 2 by means of a coil spring 25 engaged at one end in the aperture 20 of the lever and at its other end 26 with the bottom of the hollow or recess 27 in the hood 10. Thus the spring is extended into the hood and is protected against sleet formation which would tend to hamper the contractile action of the spring.

The throwout lever 16 naturally assumes the position shown in Fig. 2. When the fuse link 7 is placed in the tube 1 as shown in Fig. 1, it will be passed beneath the finger 18 of the lever 16 to hold the lever in the position shown and will then be placed between the clamping jaws 14 and 23. In order to facilitate the placing of the fuse link between the clamping jaws 14 and 23, the slot 22 in the arm 21 of the throwout lever 16 is provided. This slot 22 permits the throwout lever 16 to be moved downwardly on the pin 15 relative to Fig. 2 for the purpose of separating the clamping jaws 14 and 23. When these jaws have been separated sufficiently, the link may then be placed between them and upon release of the lever 16, the spring 25 will clamp the jaws to the link 7.

It will be observed that the spring-engaging arm 19 on the lever 16 is extended in a horizontal direction to the right relative to Fig. 1. This extended portion 19A serves as a means for manually moving the lever 16 to separate the jaws 14 and 23. It will be further observed that the link-engaging finger 18 on the lever 16 is directly beneath the cartridge 1. Consequently, when the jaws 14 and 23 are separated by pressing down on the portion 19A, the finger 18 will contact the end of the cartridge and serve as a pivot point while the link 7 is being inserted between the jaws.

Although the finger 18 is not shown in contact with the lower end of the cartridge, nevertheless, it will be obvious that its position relative to the cartridge when in link-stressing position, will be a matter of choice when the link is mounted in the cartridge.

Fig. 2 illustrates the portion 19A on the lever 16 in contact with the lower margin or septum portion of the hood 10, thereby serving as a stop defining the final position of the lever after the link 7 has been withdrawn from the cartridge.

The device illustrated in Figs. 1 to 3, inclusive, operates as follows: Assuming that the fuse link 7 has been tensioned as illustrated in Fig. 1, and that an overload has destroyed the upper end of the fuse link (not shown), the spring 25 will cause the lever to rotate about the pin 15 and thereby move the fuse link in a path extending downwardly and arcuately from the lower end of the tube 1. When the lever 16 has moved a given distance in the path indicated, the jaws 14 and 23 will be separated sufficiently to permit the link to drop from the structure, thereby clearly indicating that the circuit through the fuse has been opened.

From the foregoing disclosure, it becomes obvious that I have provided for a throwout device having a spring-actuated lever, a novel shielding hood for the spring and the lever pivot which will prevent the accumulation of sleet.

I claim:

1. In a fuse link throwout device for expulsion fuse cartridges, a supporting arm adapted for attachment to a fuse cartridge, a throwout lever pivotally mounted on said arm and having a link-tensioning position, said lever being pivotally mounted intermediate its ends to provide a link-tensioning arm and lever-actuating arm, a spring coacting between said supporting arm and link-tensioning arm to move said lever from its link-tensioning position, and a protecting hood and apron substantially enclosing said spring and pivot.

2. In a fuse link throwout device for expulsion fuse cartridges, a supporting arm adapted for attachment to a fuse cartridge, a throwout lever pivotally mounted on said arm and having a link-tensioning position, a spring coacting between said arm and lever to move said lever from its link-tensioning position, said lever being slidable on its pivotal connection with said arm in a direction opposed to the direction of movement of said spring, and a hood and apron substantially enclosing said spring and pivotal connection.

3. In a fuse link throwout device for expulsion fuse cartridges, a supporting arm having one end adapted for attachment to a cartridge and the other end provided with a cavity and a pair of relatively spaced paralleling aprons, extending from the open end of said cavity, a pivot pin secured to and extending between said aprons, a throwout lever having a pivot arm positioned between said aprons and provided with an elongated slot slidably receiving said pin, said lever having upon one side of said pivot arm a fuse link-engaging finger and upon the other side of said pivot arm a lever-actuating extension receivable in said recess, and a spring anchored at one end to the bottom of said recess and connected at the other end with said extension.

4. In a fuse link throwout device for expulsion fuse cartridges, a supporting arm having one end adapted for attachment to a cartridge and the other end provided with a cavity and a pair of relatively spaced paralleling aprons extending from the open end of said cavity, a pivot pin secured to and extending between said aprons, a throwout lever having a pivot arm positioned between said aprons and provided with an elongated slot slidably receiving said pin, said lever having upon one side of said pivot arm a fuse link-engaging finger and upon the other side of said pivot arm a lever-actuating extension receivable in said recess, a clamping jaw on one of said aprons adjacent the margin thereof and projecting laterally therefrom, a cooperating clamping jaw on said lever, and a spring anchored at one end to the bottom of said recess and connected at the other end with said extension.

5. In a fuse link throwout device for expulsion fuse cartridges, a supporting arm having one end adapted for attachment to a cartridge and the other end provided with a cavity and a pair of relatively spaced paralleling aprons extending from the open end of said cavity, a pivot pin secured to and extending between said aprons, a throwout lever having a pivot arm positioned between said aprons and provided with an elongated slot slidably receiving said pin, said lever having upon one side of said pivot arm a fuse link-engaging finger and upon the other side of said pivot arm a lever-actuating extension receivable in said recess, and a stop on said extension engageable with said support.

6. In a fuse link throwout device for expulsion fuse cartridges, a supporting arm having one end adapted for attachment to a cartridge and the other end provided with a cavity and a pair of relatively spaced paralleling aprons extending from the open end of said cavity, a pivot pin secured to and extending between said aprons, a throwout lever having a pivot arm positioned between said aprons and provided with an elongated slot slidably receiving said pin, said lever having upon one side of said pivot arm a fuse link-engaging finger and upon the other side of said pivot arm a lever-actuating extension receivable in said recess, a clamping jaw on one of said aprons adjacent the margin thereof and projecting laterally therefrom, a cooperating clamping jaw on said lever, a spring anchored at one end to the bottom of said recess and connected at the other end with said extension, and a stop on said extension engageable with said support.

7. In a fuse link throwout device for expulsion fuse cartridges, a supporting arm adapted for attachment to a fuse cartridge, a throwout lever pivotally mounted on said arm and having a link-tensioning position, a spring coacting between said arm and lever to move said lever from its link-tensioning position, said lever being movable on its pivotal connection with said arm in a direction radially relative to said connection and opposed to the action of said spring, and inter-acting clamping jaws on said arm and lever in proximity to said pivotal connection and separable when said lever is moved in said radial direction, the free end of said lever having a fuse link engaging portion for exerting a tension thereon.

WILLIAM O. SCHULTZ.